US011372381B1

(12) United States Patent
Trowbridge

(10) Patent No.: US 11,372,381 B1
(45) Date of Patent: Jun. 28, 2022

(54) SYNTHETIC ENGINE FOR ARTIFICIAL INTELLIGENCE

(71) Applicant: David Trowbridge, North Bend, WA (US)

(72) Inventor: David Trowbridge, North Bend, WA (US)

(*) Notice: Subject to any disclaimer, the term of this patent is extended or adjusted under 35 U.S.C. 154(b) by 791 days.

(21) Appl. No.: 15/424,678

(22) Filed: Feb. 3, 2017

Related U.S. Application Data

(60) Provisional application No. 62/337,786, filed on May 17, 2016.

(51) Int. Cl.
*G05B 13/02* (2006.01)
*G06N 5/04* (2006.01)
*G06N 7/00* (2006.01)
*G06N 20/00* (2019.01)

(52) U.S. Cl.
CPC ........... *G05B 13/028* (2013.01); *G06N 5/041* (2013.01); *G06N 5/047* (2013.01); *G06N 7/005* (2013.01); *G06N 20/00* (2019.01)

(58) Field of Classification Search
CPC ...... G05B 13/028; G06N 20/00; G06N 5/041; G06N 5/047; G06N 7/005
See application file for complete search history.

(56) References Cited

U.S. PATENT DOCUMENTS

2015/0142704 A1* 5/2015 London ............ G06F 16/90332
706/11
2015/0254330 A1* 9/2015 Chan ................. G06F 16/285
707/613

OTHER PUBLICATIONS

Clement et al ("Multi-Armed Bandits for Intelligent Tutoring Systems", Journal of Educational Data Mining, vol. 7, No. 2, 2015, pp. 20-45) (Year: 2015).*
Crowder et al. ("Artificial Cognition Architectures", Springer, New York, 2013, pp. v-263) (Year: 2013).*
Muggleton et al. ("Meta-interpretive learning of higher-order dyadic datalog: predicate invention revisited", Machine Learning (2014) 100, pp. 49-73) (Year: 2014).*
Lorenzo Magnani ("Abduction and Chance: The Extra-Theoretical Dimension of Chance Discovery in Science", 2006 IEEE International Conference on Systems, Man, and Cybernetics, Oct. 8-11, 2006, pp. 1747-1753) (Year: 2006).*

(Continued)

*Primary Examiner* — Brian M Smith
*Assistant Examiner* — Robert Lewis Kulp
(74) *Attorney, Agent, or Firm* — Rowan TELS LLC

(57) ABSTRACT

A method of orienting a human behavioral model to a problem context in an artificial intelligence algorithm includes instantiating pattern instances from a class hierarchy to generate executable objects, each binding autonomously with a data store and executing a completeness function for the binding. The bound executable objects are joined into a pattern instance graph autonomously operating as a deduction processor, and the behavioral model is oriented to the problem context by repeatedly evaluating a fit between the bound pattern instance graphs and the human behavioral model. Behavioral models are competitively executed against the bound pattern instances to compute levels of fitness for the models and assigning one of the models as a current controller based on the levels of fitness.

18 Claims, 13 Drawing Sheets

(56) References Cited

OTHER PUBLICATIONS

Muggleton et al. ("MetaBayes: Bayesian Meta-Interpretative Learning using Higher-Order Stochastic Refinement", in Inductive Logic Programming: 23rd International Conference, ILP 2013, Rio de Janeiro, Brazil, Aug. 28-30, 2013, pp. 1-17) (Year: 2013).*

G. Schurz ("Patterns of Abduction", Synthese (2008), 164: pp. 201-234) teaches the synthesis of creative abduction according to a variety of human behavioral model (Year: 2008).*

* cited by examiner

SYNTHETIC ENGINE FOR ARTIFICIAL INTELLIGENCE

CROSS-REFERENCE TO RELATED APPLICATIONS

This application claims benefit under 35 U.S.C. 119 to U.S. application Ser. No. 62/337,786, filed on May 17, 2016, titled "A SYNTHETIC ENGINE FOR ARTIFICIAL INTELLIGENCE", and incorporated herein by reference in its entirety.

BACKGROUND

The present invention is in the technical field of artificial intelligence (AI).

Artificial intelligence is the capability of a machine to emulate intelligent human behavior. As such, it is inherently an interdisciplinary field drawing from computer science, psychology, cognitive science, physiology, math, linguistics and philosophy.

Central to the notion of intelligence is the act of logical reasoning. Humans employ three types of logical reasoning: deductive, inductive, and abductive. Deductive reasoning asserts a rule and proceeds from there to a guaranteed conclusion. Inductive reasoning starts with observations and proceeds to a generalized conclusion. Abductive reasoning starts with incomplete observations, generates hypotheses, and tests those hypotheses with additional reasoning or data to arrive at the most likely conclusion.

Conventional computer systems utilize primarily deduction (e.g., binary arithmetic and Boolean logic) and induction (e.g., statistics, especially in machine learning, not to be confused with mathematical induction).

Human reasoning proceeds in a cycle (inputs, processing, and outputs)—with the most common output being a decision. A widely used decision cycle (developed by military strategist Col. John Boyd) is called the Observe-Orient-Decide-Act (OODA) cycle[1].

While software systems can readily automate the Observe and Act phases of the OODA loop, the Orient and Decide phases remain the most challenging. Implementing this logic with rule-based systems (i.e., deduction) results in brittle systems, which are hard to maintain and extend, and lack flexibility. Implementing this logic with induction (e.g., utilizing primarily machine learning and statistics-based systems) leads to systems that do not respond well to unforeseen conditions, as they primarily require data from the past to make predictions about the future.

Humans also find the Orient and Decide phases the most challenging. To teach this process to military officers John Boyd led students though a thought experiment teaching a process he called "destruction and creation". The intent was to improve the ability to rapidly orient oneself to a specific context, examine parts of the context, and then decide on a particular configuration or approach that best fits the context given a particular goal. To do this requires deduction (analyzing the parts), induction (understanding how the parts have been assembled together in various contexts in the past), and abduction (generating hypothesis about how the parts might be assembled in the current context). This invention will use Boyd's exercise as an example to illustrate how an automated process can be constructed to synthesize deduction, induction, and abduction together to produce an engine that emulates human behavior.

John Boyd's example described a thought process that invents new devices from existing parts[2]. Boyd suggested four domains: a skier on a slope, a speedboat, a bicycle, and a toy tank. Under "skier" were various parts: chairlifts, skis, people, mountain, and chalets. These domains were linked by a web of relations, a matrix of connecting lines. Under "speedboat" were the categories of sun, boat, outboard motor, water-skier, and water. All were linked by connecting lines. Under "bicycle" were chain, seat, sidewalk, handlebars, child, and wheels. Under "toy tank" were turret, boy, tank treads, green paint, toy store, and cannon.

While the separate ingredients made sense when collected under the respective headings, the relationship between the parts and their respective domains was shattered in a process called "destructive deduction". The deduction was destructive in that the relationship between the parts and the whole was destroyed, which then allowed them to be connected in new ways.

Synthesis was then used as the basis of creativity. A new and altogether different domain was synthesized by using common qualities and connecting threads. Boyd emphasized handlebars, outboard motor, tank treads, and skies. These built a new reality—a snowmobile. Boyd then called this portion of the process "creative induction".

Boyd then considered this process of "destructive deduction" and "creative induction" to run in a cycle, described as a "dialectic engine", which powered the "orient-decide" portion of the OODA loop. This was all conceptual—Boyd never conceived how this could be reduced to practice in a machine.

Building a software engine that can improve the automation and emulation of human reasoning has many potential applications.

Conventional AI systems can solve restricted versions of AI-hard problems, though not in their full generality. When AI researchers attempt to scale systems to handle more complicated, real world situations, the systems tend to become unstable and/or unreliable. Lacking sufficient world context, they may fail due to unexpected circumstances outside of the original problem world context. A significant improvement in software based human-like reasoning may dramatically improve the fidelity, quality, and breadth of application in areas like conversational agents ("bots"), search engines, robots, personal assistants, etc.

[1] Wikipedia: the Free Online Encyclopedia, "OODA loop" [online], [retrieved on 2017-01-31], Retrieved from the internet: <https://en.wikipedia.org/wiki/OODA_loop>.

[2] Coram, R. Boyd: The Fighter Pilot Who Changed the Art of War. Back Bay Books, Reprint edition (May 10, 2004). 0316796883.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
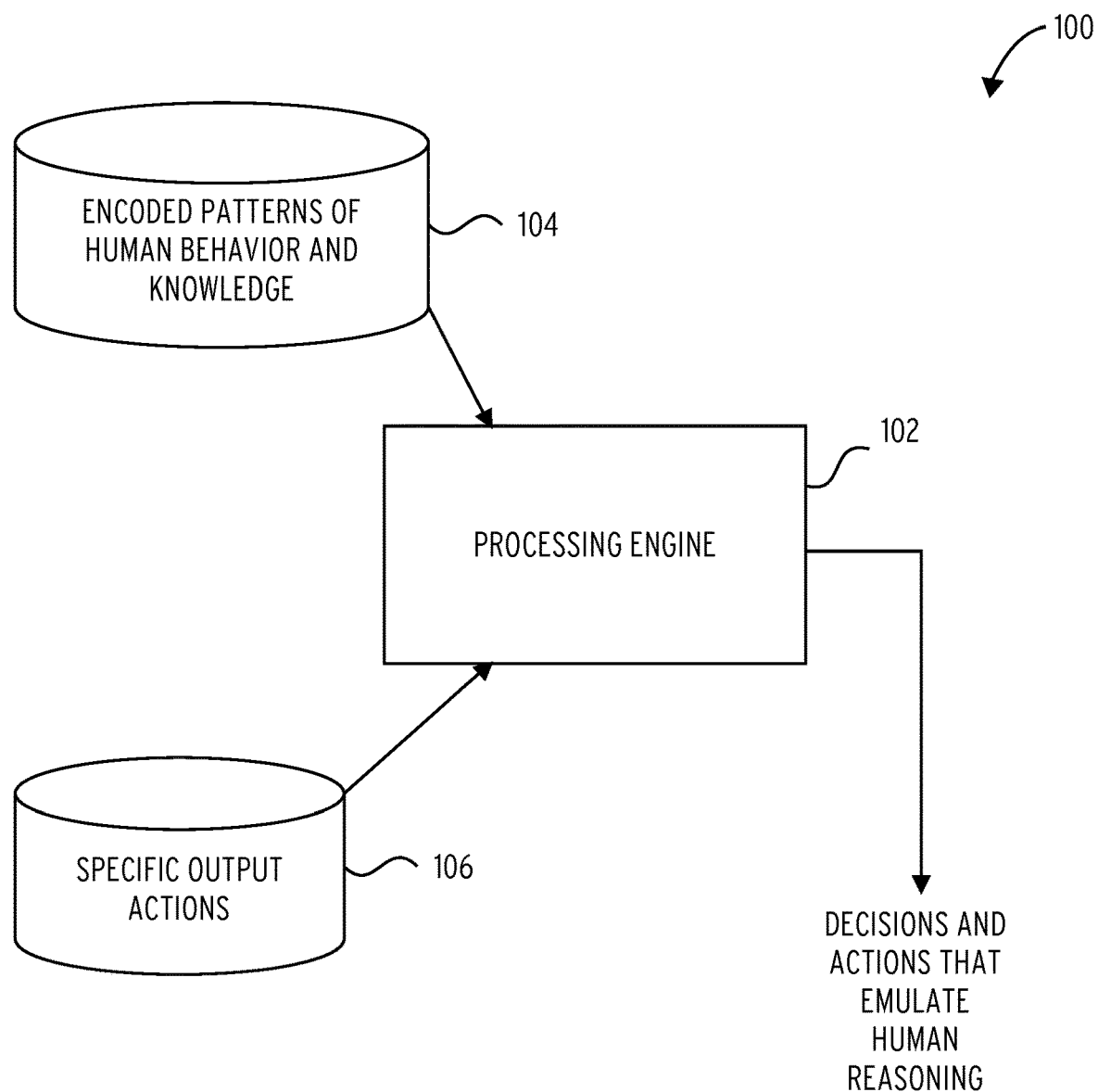
FIG. 1 illustrates an embodiment of a machine processor 100.

Referring to FIG. 1, a machine processor 100 is implemented by a computer system comprising three primary components: encoded patterns of human behavior and knowledge 104, specific output actions 106 that comprise the output of the system, and a processing engine 102 that produces decisions and actions that emulate human reasoning.

The processing engine 102 receives the encoded patterns of human behavior and knowledge 104 and the specific output actions 106. The processing engine 102 produces decisions and actions that emulate human reasoning from the encoded patterns of human behavior and knowledge 104 and the specific output actions 106. The encoded patterns of human behavior and knowledge 104 and the specific output actions 106 may be stored in a data control memory structure (such as Oracle, DB2, MySQL, PostgreSQL, SQLite, SQL Server, Sybase, Sphinx index, Elasticsearch index, MongoDB, etc.).

Figure 2:
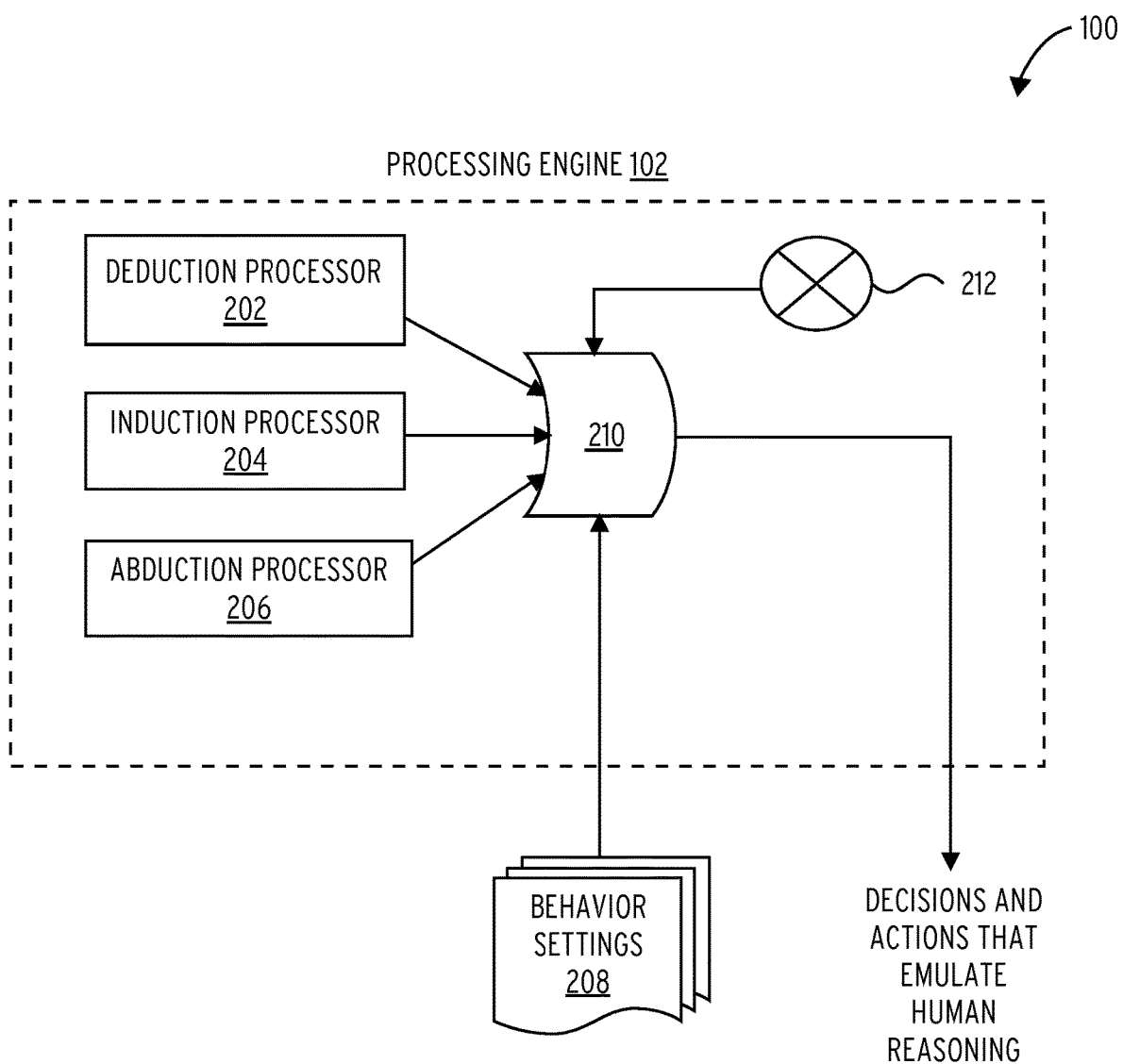
FIG. 2 illustrates an embodiment of aspects of the machine processor 100.

Referring to FIG. 2, the processing engine 102 comprises a deduction processor 202, an induction processor 204, and an abduction processor 206. The outputs of these processors are combined by a synthesizer 210, the operation of which may be influenced by a probability biaser 212 and by behavior settings 208.

During operation, the machine processor 100 accepts many types of input signals. To process these input signals, the machine processor 100 operates the processing engine 102, also referred to herein as a synthetic engine, to generate decisions and actions that emulate human reasoning and likely to result from a similar world context and the input signals (unless permuted from this result by the probability biaser 212). The processing engine 102 may be configured to emulate different types of human behavior by applying the behavior settings 208. The processing engine 102 may generate multiple decisions and actions from a given input signal. Each decision and action may be associated with a completeness value regarding the likelihood that the decision or action emulates human reasoning.

The processing engine 102 detects unusual situations (as a change in world context) and adjust its operation accordingly. To create the element of surprise, the probability biaser 212 is applied to the synthesizer 210 to generate those actions less or least likely to be generated by a human given the same inputs and world context.

The processing engine 102 combines and automates the deduction processor 202, the induction processor 204, and the abduction processor 206. The deduction processor 202, the induction processor 204, and the abduction processor 206 may be special purpose processors implemented (e.g., by emulation) on one or more general processors or may be special-purpose integrated circuit processors.

Each of the deduction processor 202, the induction processor 204, and the abduction processor 206 is operable to produce an aspect of human intelligence (deduction, induction, and abduction, respectively), to generate new hypotheses and synthesize the input signals. This results in output actions that more closely emulate human decisions as compared to conventional artificial intelligence systems. The output actions may be one or more of the actions and decisions generated by the processing engine 102 (whether utilizing the probability biaser 212 or not).

Figure 3:
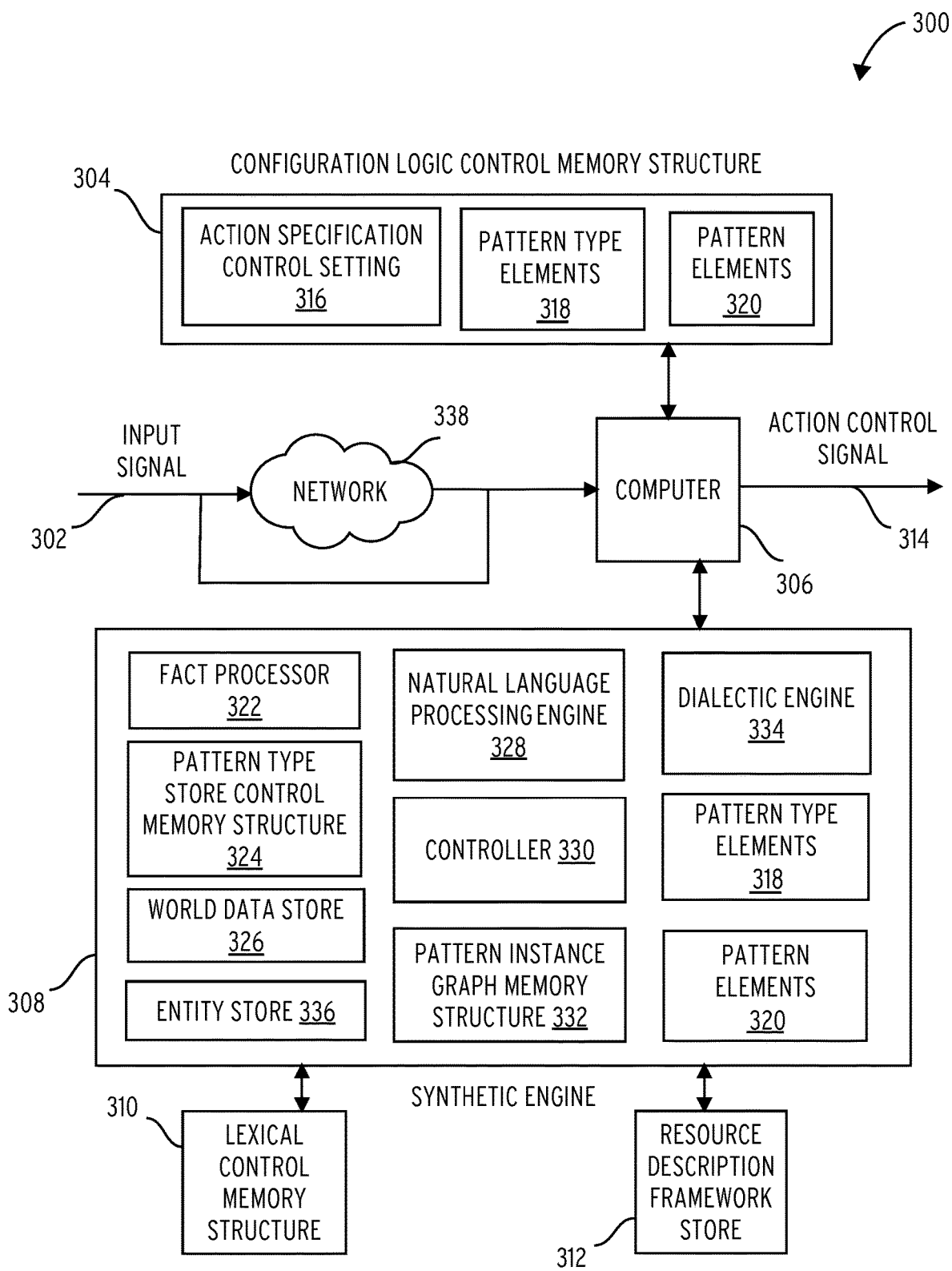
FIG. 3 illustrates an embodiment of a high-level block diagram of a system 300.

Referring to FIG. 3, a system 300 comprises an input signal 302, a configuration logic control memory structure 304, a computer 306, a synthetic engine 308, a lexical control memory structure 310, a resource description framework store 312, an action control signal 314, an action specification control setting 316, pattern type elements 318, pattern elements 320, a fact processor 322, a pattern type store control memory structure 324, a world data store 326, a natural language processing engine 328, a controller 330, a pattern instance graph memory structure 332, a dialectic engine 334, an entity store 336, and a network 338.

The input signal 302 includes, but is not limited to, messages, sensors, touch gestures, documents, training and test data with labels, application programming interface (API) invocations, etc. One or more input signal 302 are communicated over the network 338 (routers, hubs, servers, gateways, network bridges, modems, wireless access points, networking cables, line drivers, switches, and repeaters, and also include hybrid network devices such as multilayer switches, protocol converters, bridge routers, proxy servers, firewalls, network address translators, multiplexers, network interface controllers, wireless network interface controllers, ISDN terminal adapters, WAN, LAN, WWW, etc.) or through connections directly to the computer 306 (via input devices, such as, audio conversion devices, barcode readers, biometrics, business card readers, digital cameras and digital camcorders, electroencephalography (EEG), fingers (with touchscreen or Windows Touch), gamepads, joysticks, paddles, steering wheels, Microsoft Kinects, gesture recognitions, graphics tablets, keyboards, light guns and light pen scanners, magnetic ink (like the ink found on checks), magnetic stripe readers, medical imaging devices (e.g., X-Ray, CAT Scan, and Ultrasound images), microphones (using voice speech recognition or biometric verification), MIDI keyboards, MICRs, mouse, touchpad, or other pointing devices, optical mark readers (OMR), paddles, pen or stylus, punch card readers, remotes, scanners, sensors (e.g. heat and orientation sensors), sonar imaging devices, touchscreens, voices (using voice speech recognition or biometric verification), video capture devices, VR helmets and gloves, webcams, and yokes). The computer 306 is configured with the action specification control setting 316 included within a configuration logic control setting from the configuration logic control memory structure 304 that determines the possible actions the system 300 can invoke with the action control signal 314. The configuration logic control memory structure 304 also comprises the pattern type elements 318 and the pattern elements 320 that encapsulate patterns of human behavior and knowledge within the human profile control signal. The computer 306 may receive a configuration logic control signal and an action specification control signal that comprise the configuration logic control setting and the action specification control setting 316, respectively. The interaction of these components will be further explained in a discussion of FIG. 4, FIG. 5, and FIG. 6.

The computer 306 implements the synthetic engine 308. The synthetic engine 308 implements and combines multiple types of human reasoning (deductive, inductive, and abductive), applies the combined reasoning in an automated fashion to the input signal 302 and produces decisions (i.e., control signals to influence physical operations). Decisions are then transformed into concrete actions in a manner emulating the actions a human would likely decide and act on, given the same or similar inputs. In some embodiments, the system 300 is configured to decide and act differently based on different human profiles (e.g., the behavior settings 208). Additionally, if the element of surprise is desired, the system 300 can be configured to produce a decision and action based on the same input signal 302 that a human is unlikely to do. The system 300 may utilize the probability biaser 212 to produce a low probability action control signal.

The synthetic engine 308 comprises many sub-components. The fact processor 322 is configured to accept the input signal 302, operates the natural language processing engine 328 (such as, Apertium, Deeplearning, DELPH-IN, Distinguo, General Architecture for Text Engineering (GATE), Gensim, LinguaStream, Mallet, Modular Audio Recognition Framework, MontyLingua, Natural Language Toolkit (NLTK), Apache OpenNLP, UIMA, etc.) to extract concepts from the input signal 302, and retrieves related words and word structure from the lexical control memory structure 310 (e.g., WordNet, the CMU Pronouncing Dictionary of American English, MRC Psycholinguistic Database, Lists of high-frequency English lemmas and wordforms (data from CCAE), the Verb Semantics Ontology Project, CSLI, the Twitter Current English Lexicon, as well as, lexical control memory structures in other languages or similar). The fact processor 322 also extracts entities from the input signal 302, then queries the external resource description framework store 312 for related entities and associations (such as DBpedia, Creative Commons, FOAF (Friend of a Friend), Haystack client, IDEAS Group, Microsoft Connected Services Framework, MusicBrainz, NEPOMUK, Press association, RDF Site Summary, Simple Knowledge Organization system (SKOS), SIOC (Semantically-Interlinked Online Communities), and Smart-M3). Based on data received from the lexical control memory structure 310, the resource description framework store 312, and the existing internal state, the world data store 326 is populated with facts, related entities, associations, word concepts, and conversation state. This includes parse trees and tagged words from the lexical control memory structure 310.

Referring back to the sub-components of the synthetic engine 308 shown in FIG. 3, there is a set of components that interact to reason about the entities in the world data store 326. These components include the pattern type store control memory structure 324 (e.g., a pattern type store control memory structure), the pattern instance graph memory structure 332, the dialectic engine 334, the pattern elements 320, the pattern type elements 318, the controller 330, and the entity store 336. The interaction of these components will be further explained in a discussion of FIG. 4, FIG. 5, and FIG. 6.

Figure 4:
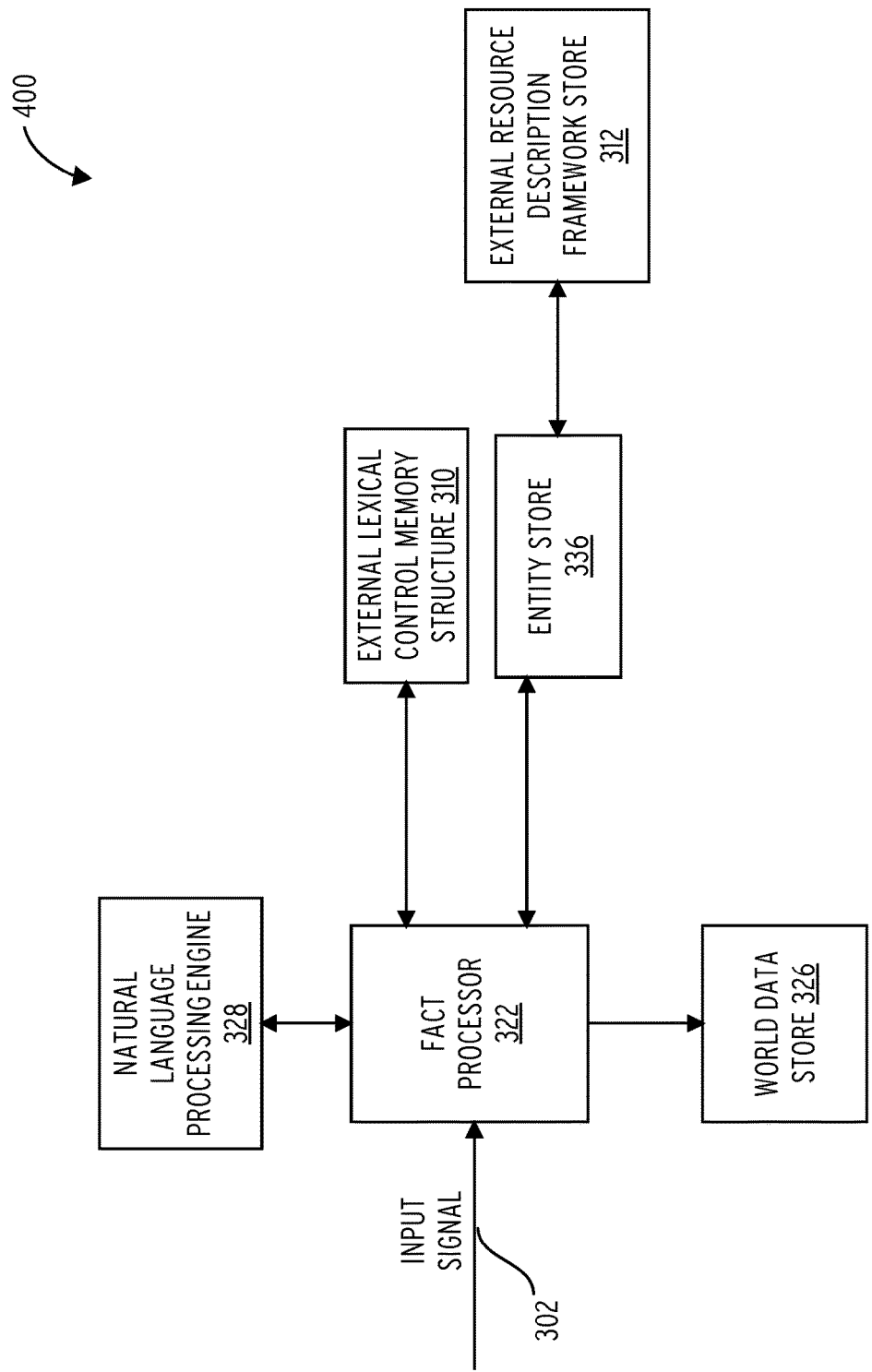
FIG. 4 illustrates an embodiment of initial receipt, fact processing, and storage of source inputs by a system 400.

Referring to FIG. 4, a system 400 comprises an input signal 302, a fact processor 322, a lexical control memory structure 310, an entity store 336, a resource description framework store 312, a world data store 326, and a natural language processing engine 328.

The fact processor 322 receives the input signal 302. Concepts determined by natural language processing performed by the natural language processing engine 328 are compared to lexical associations contained within a lexical control received from the lexical control memory structure 310. The fact processor 322 also extracts entities from the input signal 302, then queries the external resource description framework store 312 for related entities, events, states, and associations. In some embodiments, this is performed by the entity store 336. Based on data received from the lexical control memory structure 310, the external resource description framework store 312 and existing internal state, the world data store 326 is populated with facts, related entities, associations, word concepts, events, and conversation state. This includes parse trees and tagged words from the lexical control memory structure 310.

Figure 5:
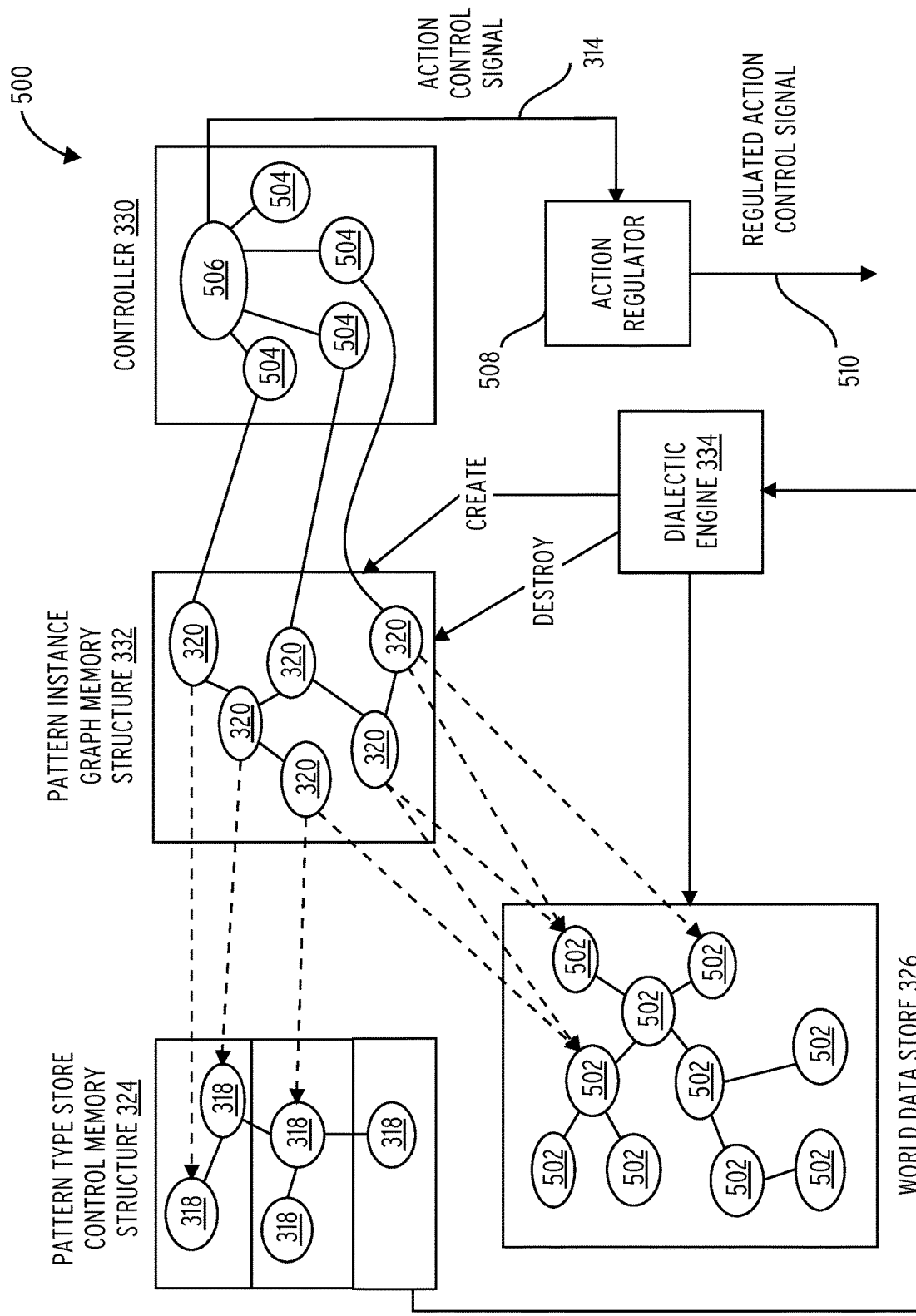
FIG. 5 illustrates an embodiment of transformation of source inputs by a system 500.

Referring to FIG. 5, a system 500 comprises an action control signal 314, pattern type elements 318, pattern elements 320, a pattern type store control memory structure 324, a world data store 326, a controller 330, a pattern instance graph memory structure 332, a dialectic engine 334, entities 502, controller elements 504, a current controller element 506, an action regulator 508, and a regulated action control signal 510.

Conventional software design patterns are conventionally expressed in text format, and conventional automated tooling expands these patterns in a particular programming language once a pattern is selected by a human. Once a tool expands the pattern, the generated code becomes part of the static compiled solution. In contrast, disclosed herein are embodiments of a system (e.g., the system 500) that encapsulate pattern knowledge in the form of pattern instances of the pattern elements 320, which are then instantiated as autonomous running agents connected in the pattern instance graph memory structure 332 and governed by the controller 330. The controller 330 selects the best fitting combinations of connected pattern instances of the pattern elements 320 and applies them to a solution without human intervention.

The pattern type store control memory structure 324 comprises the pattern type elements 318 encoded at multiple levels of a machine memory control structure, e.g., "levels of abstraction", with relationships between the elements that traverse these levels. Classifying patterns as class components, at different levels of abstraction, with relationships across these levels of abstraction is a technique practiced and documented in the domain of software design patterns.

The world data store 326 comprises concrete or specific facts, entities, states, events, and relationships, embodied as the entities 502. The entities 502 are generated as described in FIG. 4. The entities 502 are bound to the pattern instances of the pattern elements 320 bind to in order to solve problems or make decisions.

The pattern instance graph memory structure 332 comprises instances of the pattern elements 320. A pattern instance of the pattern elements 320 may be implemented as an active object comprising an executable model and logic to search and evaluate elements fitting the model. The pattern type elements 318 comprise information about the pattern and its relationship to other patterns, facts, and relationships to both concrete and abstract items. There can be multiple instances of pattern instances of the pattern elements 320 instantiated from one of the pattern type elements 318. The pattern instances of the pattern elements 320 bind to the entities 502 in the world data store 326 in order to solve problems or make decisions. Because pattern instances of the pattern elements 320 may comprise incomplete models that may be bound to many of the entities 502 in the world data store 326, there may be many pattern instances of the pattern elements 320 of the same pattern type elements 318 instantiated in the pattern instance graph memory structure 332, which vary mainly in the pattern elements 320 to which they bind.

Intrinsic to a pattern instance is a set of well-formed, programmatic questions and answers targeted towards determining the degree in which the entities 502 in the world data store 326 may be bound to portions of the pattern instance. Each pattern instance comprises a real numbered value ranging from 0 to 1.0 which expresses the potential of all pattern elements 320 contained by the pattern instance to be bound to the entities 502 in the world data store 326. This value may be referred to as a completeness value (related to Godel's Incompleteness Theorem). The completeness value is used to store the output of the multi-valued logic operation to calculate the degree of completeness of the pattern with respect to the pattern elements 320 it has been able to bind to at this point in time.

The controller 330 allocates system resources (e.g., memory, processor utilization, or bandwidth) to govern system components including the pattern type store control memory structure 324, the world data store 326, the pattern instance graph memory structure 332 and the dialectic engine 334, as well as the deduction processor 202, the induction processor 204 and the abduction processor 206. The controller 330 may allocate system resources to associate the entities 502 with the pattern type elements 318 stored in the pattern type store control memory structure 324 and to instantiate the pattern elements 320 in the pattern instance graph memory structure 332. The controller 330 governs the pattern instances of the pattern elements 320 by continually evaluating combinations of the pattern instances of the pattern elements 320 to determine the best fit of these pattern elements 320 with the context represented in the world data store 326 and desired human behavior. The various combinations of the pattern instances of the pattern elements 320 represent a hypothesis of the world. As the system traverses up the hierarchy of connected pattern elements 320, ultimately a root node is reached. This root node is connected to the controller elements 504. Because there may be many different pattern bindings, there may be many different controller elements 504 applied to a particular input signal. Each group of the pattern elements 320 that represents a possible conception of the world has one of the controller elements 504 at the root. The controller 330 also assigns one of the controller elements 504 to be the current controller element 506. The current controller element 506 is a best-fit to a model that the system 500 implements of the world at the present time. The controller 330 operates to evaluate these combinations and select one to be the current controller element 506 of the system, which is responsible for current decision-making.

The current controller element 506 may allocate system resources (e.g., memory, processor utilization, or bandwidth), or may generate the action control signal 314 as an output to affect the state of one or more machines. Allocation of system resources may result in further entities 502 being generated, binding further pattern elements 320 to the entities 502, new controller elements 504, and a different current controller element 506 being selected by the controller 330. The allocation of system resources may be done in conjunction with the behavior settings 208. The system resources may also include the deduction processor 202, the induction processor 204, and the abduction processor 206. The one or more machines may comprises output devices (e.g., monitors (LED, LCD, CRT, etc.), printers (all types), plotters, projector, LCD projection panels, computer output microfilm (COM), speaker(s), head phone, visual display unit, film recorder, microfiche, modems, network cards, touch screen, headsets, facsimile, and audio cards/sound cards).

The controller elements 504 compete for assignments by the system 500 as the single current controller element 506 responsible for interpreting context and making decisions for the system 500. The system 500 may utilize a single central controller or utilize a multitude of somewhat autonomous elements each operating with their own threads of control. The controller 330 continually evaluates the set of the controller elements 504 and designate one as the current controller element 506. The controller elements 504 with the greatest completeness value may be set as the current controller element 506. In some embodiments, the current controller element 506 is not a static designation. The current controller element 506 may change many times during the operation of the system 500 based on how well a particular one of the controller elements 504 fits the current state of the world data store 326 and the desired human configuration.

The operation of the system 500 includes the dialectic engine 334. Acting on both system-defined intervals and triggers, the dialectic engine 334 reads facts, related entities, associations, word concepts, events, and conversation state comprised by the world data store 326, then queries the pattern type store control memory structure 324 for related pattern type elements and instantiates instances of the pattern elements 320 in the pattern instance graph memory structure 332. Thus a process that previously was performed by humans during the design or decision phases—the allocation of pattern instances, based on type relationships, towards a concrete design or decision—is implemented by a machine system. Once instantiated, the pattern instances of the pattern elements 320 act as autonomous agents, connected in the pattern instance graph memory structure 332, attempting to reach a solution in accordance to the model comprised by the pattern type elements 318 by binding to entities 502 (e.g., specific facts, entities, and relationships) in the world data store 326. Pattern instances of the pattern elements 320 at higher levels of abstraction may bind to other pattern instances of the pattern elements 320; however, connected collections of pattern instances of the pattern elements 320 ultimately bind to one or more entities 502 in the world data store 326 in order to complete the solution or generate a specific decision. The dialectic engine 334 implements an alternating creation cycle and destruction cycle. The dialectic engine 334 operates to enable construction of decision models for determining and monitoring actions to enable a control mechanism to drive and regulate the alternating cycle of destruction and creation toward higher and broader levels of elaboration.

The deduction phase of the dialectic engine 334 begins after the dialectic engine 334 reads facts, entities, events, and relationship elements (i.e., the entities 502) from the world data store 326. The dialectic engine 334 then populates the pattern instance graph memory structure 332 by extracting the entities 502 from the world data store 326; searching the pattern type store control memory structure 324 for the pattern type elements 318 containing matching entities (this may be a fuzzy multi-valued logic search); and instantiating related pattern instances of the pattern elements 320 in the pattern instance graph memory structure 332. The pattern instances of the pattern elements 320 are then connected to the related entities 502 in the world data store 326. In this way, the dialectic engine 334 forms multiple possible conceptions of the "world" represented by various combinations of pattern instances of the pattern elements 320 connected to specific entities 502 in the world data store 326.

Next, objects are created which represent human behavior based on different types of humans and their behaviors. A human object is encapsulated as the pattern type elements 318 and instantiated in the pattern instance graph memory structure 332 as the pattern instance of the pattern elements 320. Human pattern types encode factors such as roles (e.g., inventors, reporters, academics, engineers, etc.), personality types (Briggs Meyer, etc.), intelligence level and curiosity levels, goals, and Jungian archetypes. These factors affect the method implementations of the related pattern instance, which applies the pattern form to solve the problem/goal configured within the forces/constraints that bear upon the human in the world context. The human pattern instance of the pattern elements 320 interacts with the current controller element 506 to generate the action control signal 314 from a set of potential actions. In some embodiments, the action control signal 314 answers questions about the world as governed by the goal encoded in the human pattern instance of the pattern elements 320.

The creation phase of the create/destroy cycle begins with execution of the dialectic engine 334, which employs a combination of concrete and fuzzy logic binding strategies. Using a concrete binding strategy, the dialectic engine 334 invokes each of the controller elements 504 to traverse to its root pattern instance of the pattern elements 320. The pattern type store control memory structure 324 is queried for pattern instances of the pattern elements 320 with the relationship of "supertype". For each pattern instance of the pattern elements 320 found, the pattern type store control memory structure 324 is queried for pattern instances with the relationship of "subtype". These types may be matched by exact type name, or synonyms of the type as defined in the lexical control memory structure 310. For each subtype, the bind operation is invoked on each pattern elements 320 comprised by the pattern instance. The bind operation continues to use this "supertype" and "subtype" traversal strategy until it finds and acceptable match, or else it terminates.

The bind operation returns the bound pattern instance or bound pattern element and a value between 0 and 1 indicating the completeness value of the bind. The pattern instance initiating the bind operation applies multivalued logic to calculate the overall completeness of the pattern instance to bind and stores it as the completeness value of the pattern instance. The dialectic engine 334 then evaluates each new bound pattern instance against a threshold, and instantiates instances meeting the threshold value (received in a threshold value control from a threshold value control memory structure) in the pattern instance graph memory structure 332 and creates new controller elements 504 linked to the newly created pattern instance. In this way, the system 500 forms a new model of a possible world with a quantitative value indicating a degree of fitness. The controller 330 then evaluates the new controller elements 504 against existing controller elements 504 to select the new current controller element 506 (which is the main controller with which the human object interacts). This implements the creation of new hypotheses via emulating the process of logical abduction.

An alternate binding strategy is the fuzzy binding strategy. Using this strategy, pattern elements 320 are queried for their predicate attribute, which describes a set of relationships between the pattern elements 320 using first order logic. The pattern type store control memory structure 324 is searched for matching pattern type elements 318 that match on the relationship expressed in the source pattern. The match can be on the exact name or a synonym retrieved from the lexical control memory structure 310. If a match is found on the predicate attribute (subject-predicate-object), the dialectic engine 334 forms a hypothesis that this "could be" a binding of the source pattern elements 320. To test this hypothesis, the dialectic engine 334 uses inductive reasoning to query an internet search engine (e.g., Google) for a set of documents matching the subject-object-predicate. The dialectic engine 334 utilizes the natural language processing engine 328 to extract pages containing these entities, tags them with parts of speech, and creates parse trees. The parse trees are then analyzed for part-of-speech relationships that match the predicate attribute (subject-predicate-object) or their synonyms. Bayesian inference is then run on the returned pages to quantify the posterior probability that the entities on the page matching the predicate attribute given the presence of the entities on the page.

The destruction phase of the create/destroy cycle is then implemented. The destruction phase is implemented as part of the creation stage of the cycle. The active pattern instances of the pattern elements 320 are not limited to those bound to the current entities 502 in the world data store 326; the ability to traverse supertypes and subtypes of the pattern elements 320 frees the direct connections of the pattern elements 320 to the entities 502 of the world data store 326. In this way, the relationships between the entities and their parts represented in the world data store 326 are 'destroyed' with respect to the synthetic engine 308, as the engine is now free to bind the same parts to different patterns in the pattern instance graph memory structure 332, adding additional relationships (hypotheses) in the pattern instance graph memory structure 332. The original relationships are only logically "destroyed", the original patterns are still preserved. In this way, the pattern instance graph memory structure 332 is extended with new hypotheses. Additionally, the destruction phase is implemented programmatically, as the dialectic engine 334 sets to inactive those controller elements 504 that do not meet a minimum threshold of completeness. This conserves processor resource cycles for the dialectic engine 334. The dialectic engine 334 selectively activates these inactive controller elements 504 periodically to see if new information has improved their completeness value.

As the system 500 receives the input signal 302, the cycle repeats as follows: starting with the pattern type store control memory structure 324 and searching across the bound entities 502 in the world data store 326; searching the resource description framework store 312 and lexical control memory structure 310 for related concepts; adding any new related pattern elements 320 in the pattern instance graph memory structure 332; traversing the pattern type elements 318 connections to find alternate possible combinations of pattern instances that represent possible conceptions of the world; and adding these new combinations of pattern instances to the pattern instance graph memory structure 332. Each of these new combinations of pattern instance would also have one of the controller elements 504 at its root. At this point, the system saves to the pattern type store control memory structure 324 or the resource description framework store 312 (via an action control signal 314) the relationship between the set of controller elements 504 and the newly added controller elements 504. When the system is presented again with the same set of controller elements 504, it can recall the additional controller elements 504 it previously added, and in this way the system "learns" from previous experiences. More concretely, the system improves its performance based on experience without additional programming.

As described above, each of the controller elements 504 has a completeness value that is calculated from the set of pattern elements 320 to which they point. To emulate the element of surprise, the controller elements 504 with the least completeness value is designated as the current controller element 506 and is used to make decisions and output actions. These decisions and actions represent those least likely to be those that the selected type of human might perform (and still have some level of reasonable probability).

Each of pattern elements 320 and pattern instance also comprises a second value called the entropy value. Both the completeness and entropy values affect the destruction cycle. The entropy value describes the unpredictability in extracting the information used to bind any remaining unbound pattern sub-elements to the entities 502 in the world data store 326. This indicates the likely payoff in information gain realized by allocating additional processor cycles to try to bind more sub-elements of this pattern instance to the entities 502 in the world data store 326. This is utilized to conserve processor cycles.

The action regulator 508 transforms the action control signal 314 into the regulated action control signal 510. The action regulator 508 removes a set of actions based on rules and specific disallowed actions. The action regulator 508 may receive a regulation control signal to determine the rules and specific disallowed actions. In some embodiments, the action regulator 508 removes actions that may injure a human being or, through inaction, allow a human being to come to harm. The action regulator 508 may remove actions that do not protect the continued existence of the system 500, as long as those actions do not injure a human being or, through inaction, allow a human being to come to harm. Additionally, the action regulator 508 may receive a shutdown signal as an input (e.g., hardcoded shutdown phrase) that prevents the system 500 from sending any regulated action control signal 510.

Figure 6:
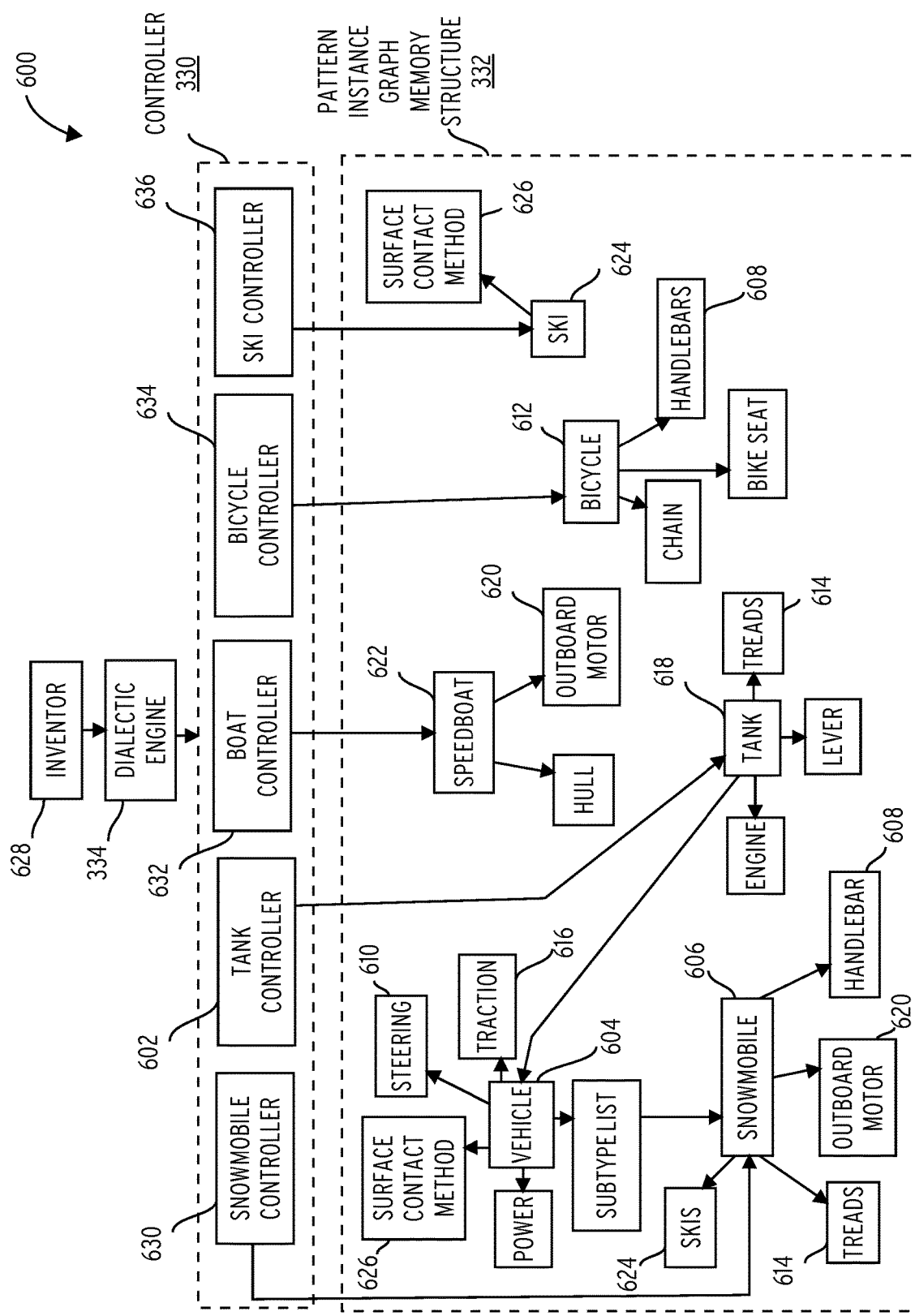
FIG. 6 illustrates an embodiment of the operation of the dialectic engine of a system 600 to generate multiple interpretations of input signals and world context.

Referring to FIG. 6, a system 600 may comprise a controller 330, a pattern instance graph memory structure 332, a dialectic engine 334, a tank controller 602, a vehicle element 604, a snowmobile element 606, a handlebar element 608, a steering element 610, a bicycle element 612, a treads element 614, a traction superclass 616, a tank element 618, an outboard motor element 620, a speedboat element 622, a skis element 624, a surface contact method 626, an inventor human pattern instance 628, a snowmobile controller 630, a bicycle controller 634, and a ski controller 636.

The controller 330 comprises the tank controller 602, the snowmobile controller 630, the boat controller 632, the bicycle controller 634, and the ski controller 636. Each is connected to a root node in the pattern instance graph memory structure 332. The tank controller 602 is connected to the tank element 618; the snowmobile controller 630 is connected to the snowmobile element 606; the boat controller 632 is connected to the speedboat element 622; the bicycle controller 634 is connected to the bicycle element 612; and the ski controller 636 is connected to the skis element 624. The controller 330 may comprise additional controller elements 504.

The pattern instance graph memory structure 332 may comprise pattern elements 320, including the vehicle element 604, the snowmobile element 606, the handlebar element 608, the steering element 610, the bicycle element 612, the treads element 614, the traction superclass 616, the tank element 618, the outboard motor element 620, the speedboat element 622, the skis element 624, and the surface contact method 626. The pattern instance graph memory structure 332 may comprise additional pattern elements 320.

In one embodiment, the system 600 emulates the "Boyd Scenario". The dialectic engine 334 invokes the tank controller 602 create method. The tank controller 602 traverses to the vehicle element 604. The vehicle element 604 traverses to the snowmobile element 606.

The snowmobile element 606 attempts to bind the handlebar element 608. The handlebar element 608 queries the pattern instance graph memory structure 332 to find the steering element 610. The steering element 610 has a subclass called handlebar element 608 associated with the bicycle element 612 in the pattern instance graph memory structure 332. The handlebar element 608 is now bound to the snowmobile element 606 using the handlebar element 608 in the bicycle element 612.

The snowmobile element 606 then attempts to bind the treads element 614. The treads element 614 searches the pattern instance graph memory structure 332 to find the traction superclass 616. The traction superclass 616 traverses the traction superclass 616 to find the treads element 614 in the tank element 618. The snowmobile element 606 then binds the treads element 614 to the treads element 614 in the tank element 618.

This process continues with the outboard motor element 620 binding to the speedboat element 622 and the skis element 624 binding through the surface contact method 626 to the surface contact method 626. The dialectic engine 334 then creates the snowmobile element 606 in the pattern instance graph memory structure 332 and creates the snowmobile controller 630.

Figure 7:
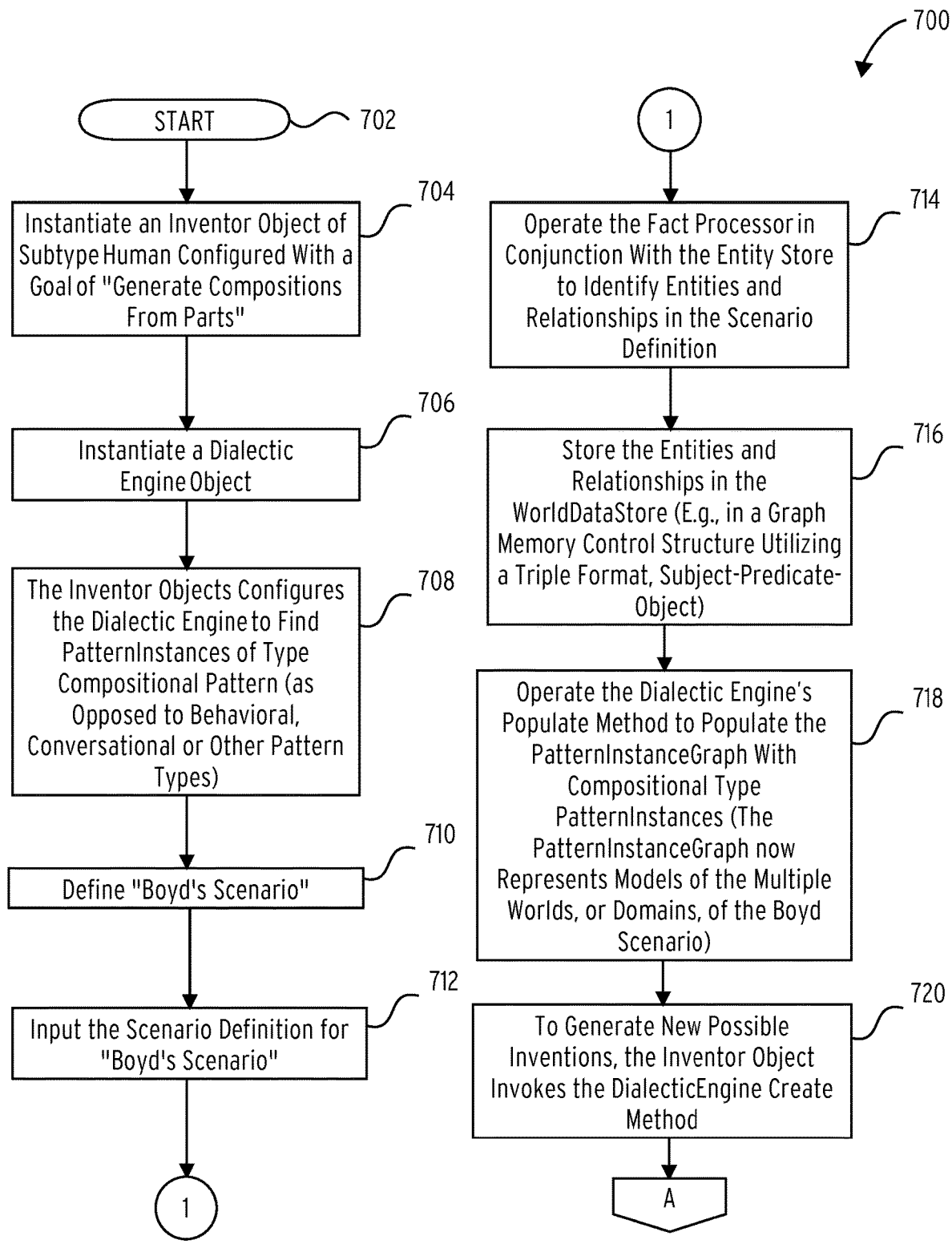
FIG. 7 illustrates an embodiment of an AI process 700.

Referring to FIG. 7, in one embodiment, the AI process 700 begins (start block 702). An Inventor object of subtype Human is configured with a goal of "generate compositions from parts" (block 704). A dialectic engine object is instantiated (block 706). Via the Inventor objects, the dialectic engine is configured to find PatternInstances of type Compositional Pattern (as opposed to behavioral, conversational, or other pattern types) (block 708). "Boyd's Scenario" is defined (block 710). The scenario definition is input for "Boyd's Scenario"[3] (block 712). The fact processor is operated in conjunction with the entity store to identify entities and relationships in the scenario definition (block 714). The entities and relationships are stored in the world data store, e.g., in a graph memory control structure utilizing a triple format (Subject-Predicate-Object) (block 716). The dialectic engine's populate method is operated to populate the pattern instance graph memory structure with compositional type pattern instances (the pattern instance graph memory structure now represents models of the multiple worlds, or domains, of the Boyd Scenario) (block 718). The dialectic engine create method is invoked via the Inventor object to generate new possible inventions (block 720).

Figure 8:
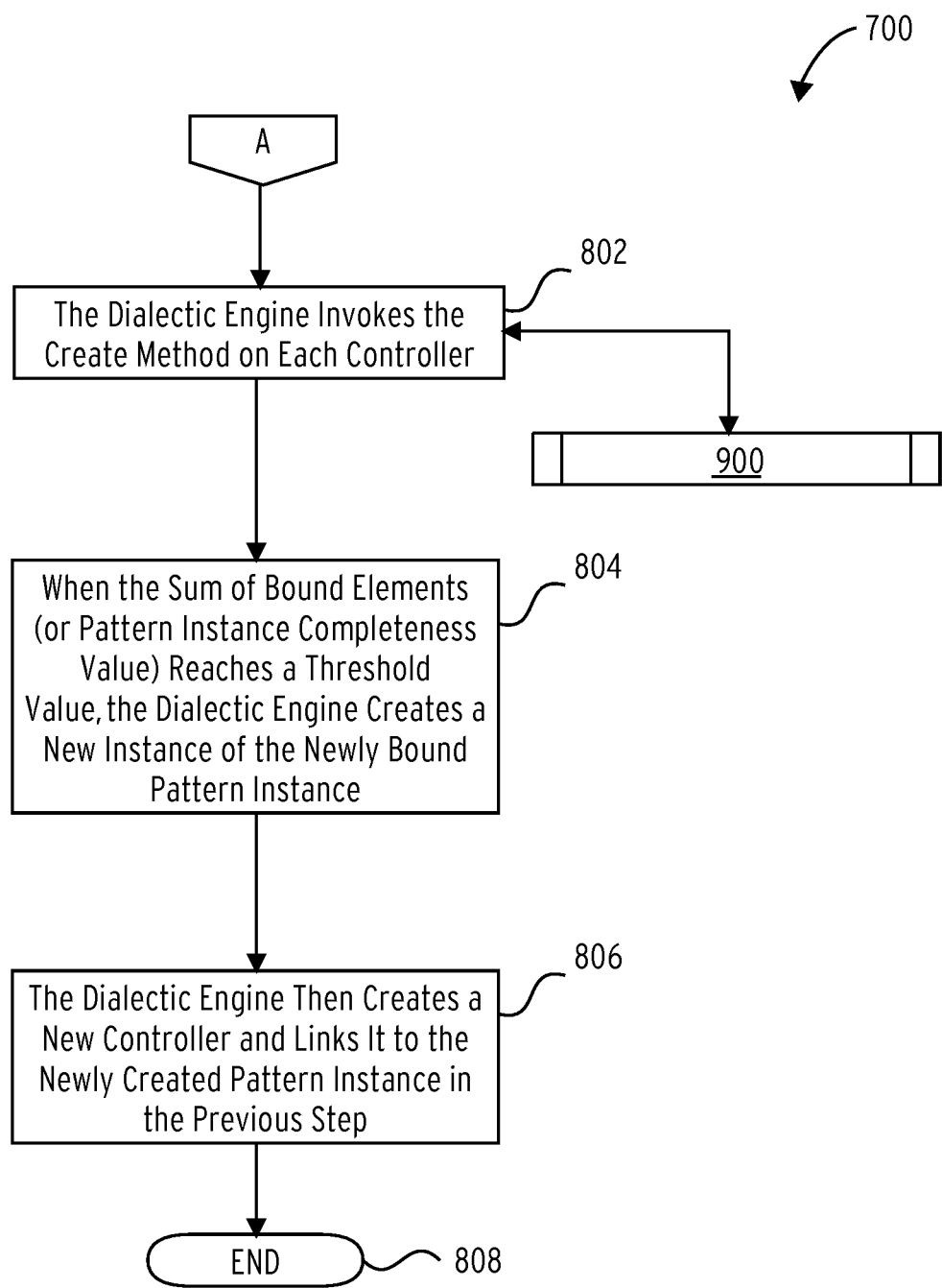
FIG. 8 illustrates an embodiment of an AI process 700.

Referring now to FIG. 8, the create method is invoked on each controller via the dialectic engine (block 802). The create method is further described in FIG. 9. When the sum of bound elements (or pattern instance completeness value) reaches a threshold, a new instance of the newly bound pattern instance is created (block 804). A new controller is created and linked to the newly created pattern instance in the previous step (block 806). Effectively a new hypothesis has been added to the system. The AI process 700 ends (done block 808).

Figure 9:
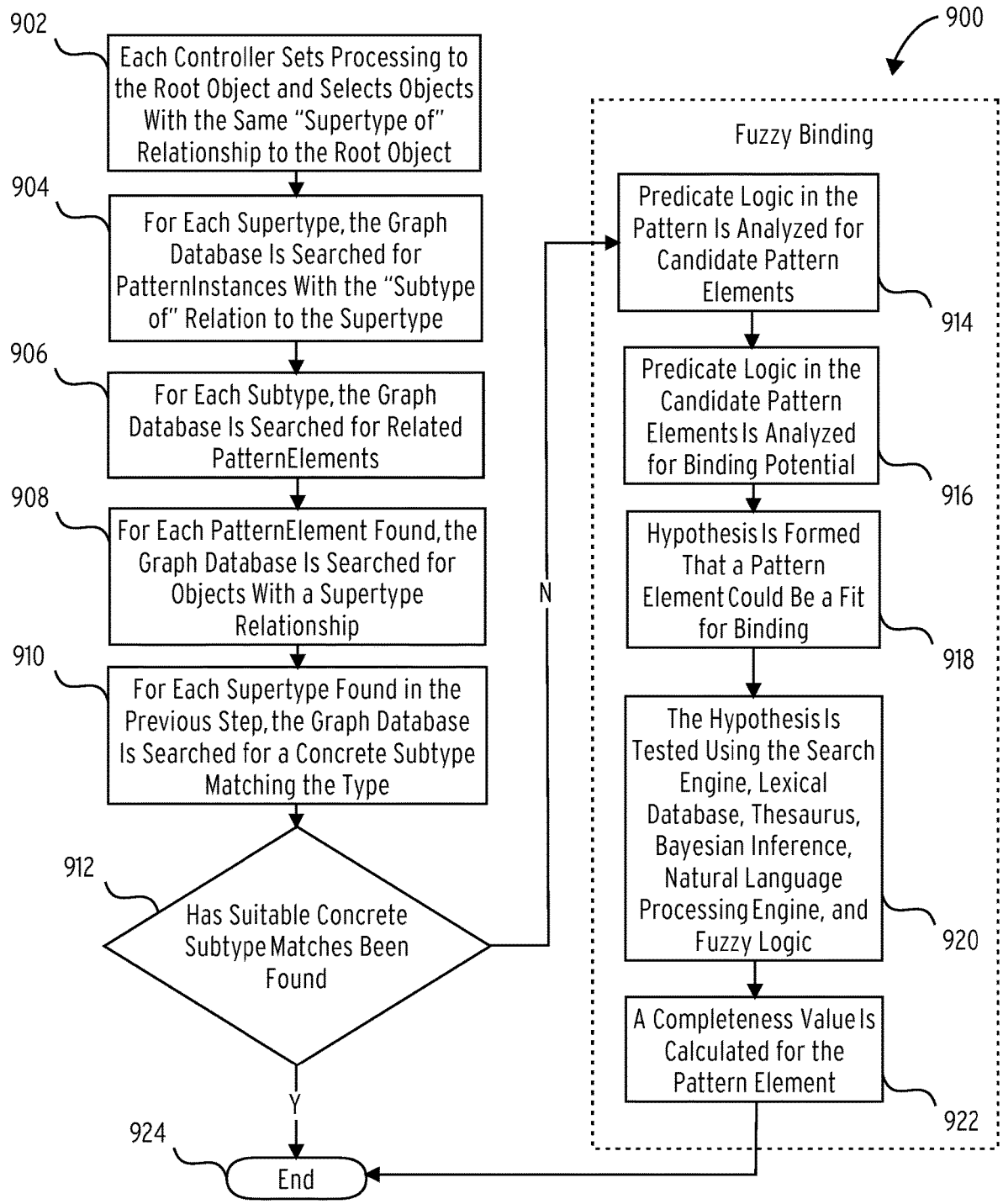
FIG. 9 illustrates an embodiment of a create method subroutine 900.

Referring to FIG. 9, the create method subroutine 900 instructs each controller to set processing to the root object and selects objects with the same "supertype of" relationship to the root object (block 902). For each supertype, the graph database is searched for pattern instance with the "subtype of" relation to the supertype (block 904). For each subtype, the graph database is searched for related pattern elements (block 906). For each pattern elements found, the graph database is searched for objects with a supertype relationship (block 908). For each supertype found in the previous step, the graph database is searched for a concrete subtype matching the type (block 910). If a match is found, the matched element is concretely bound to specific pattern instance and the create method subroutine 900 ends (done block 924).

If a match is not found, and the controller allocates resources to perform further processing cycles, the search for bound pattern elements continues by utilizing a fuzzy binding strategy. The predicate logic in the pattern is analyzed for candidate pattern elements (block 914). The predicate logic in the candidate pattern elements is analyzed for binding potential (block 916). A hypothesis is formed that a pattern element could be a fit for binding (block 918). The hypothesis is tested utilizing the search engine, lexical database, thesaurus, Bayesian inference, natural language processing engine, and fuzzy logic (block 920). A completeness value is calculated for the pattern element (block 922). The create method subroutine 900 then ends (done block 924).

Figure 10:
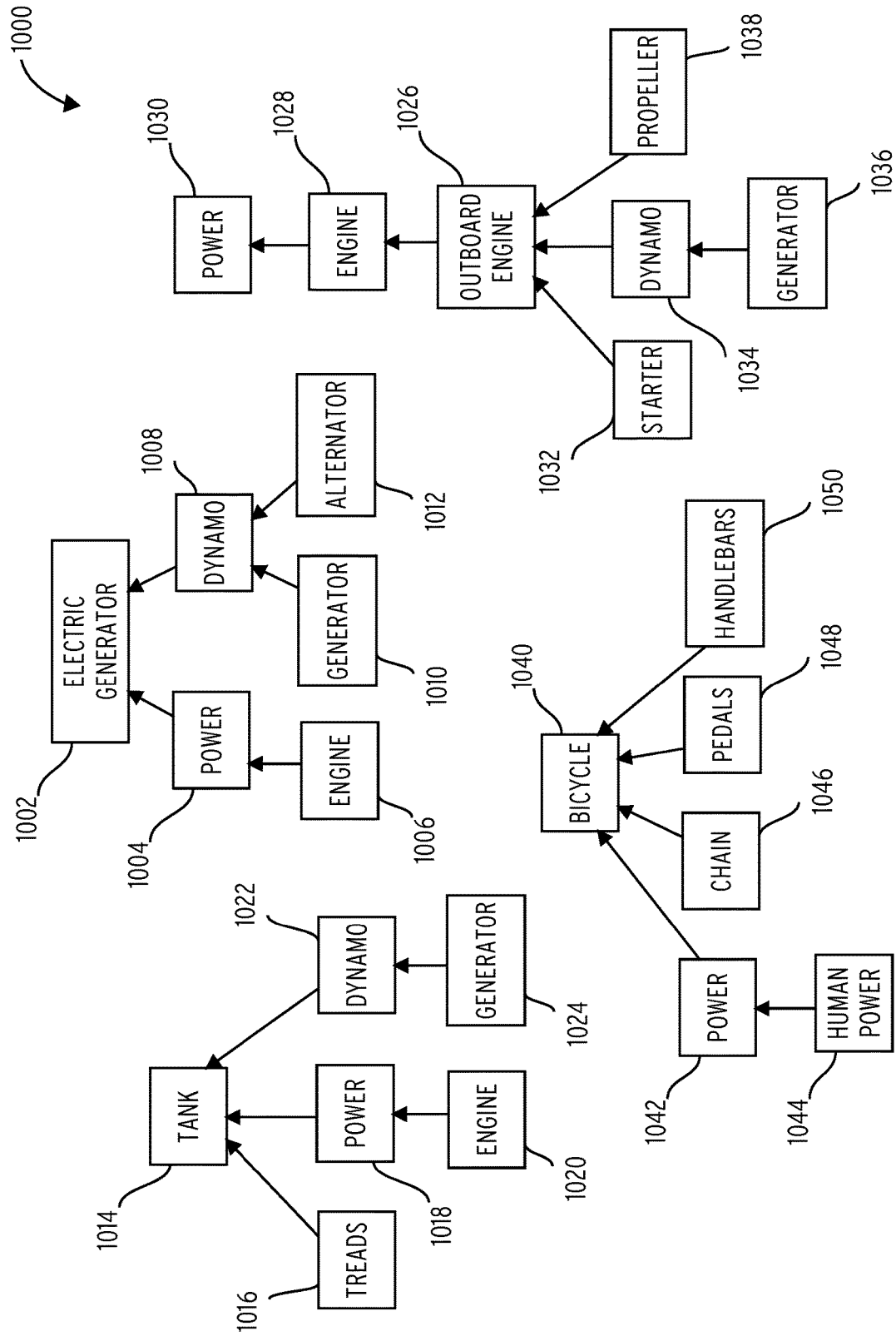
FIG. 10 illustrates an embodiment of a system 1000.

Referring to FIG. 10, a system 1000 comprises an electric generator element 1002, an electric generator—power element 1004, an electric generator—engine element 1006, an electric generator—dynamo element 1008, an electric generator—generator element 1010, an electric generator—alternator element 1012, a tank element 1014, a tank—treads element 1016, a tank—power element 1018, a tank—engine element 1020, a tank—dynamo element 1022, a tank—generator element 1024, an outboard engine element 1026, an outboard engine—engine element 1028, an outboard engine—power element 1030, an outboard engine—starter element 1032, an outboard engine—dynamo element 1034, an outboard engine—generator element 1036, an outboard engine—propeller element 1038, a bicycle element 1040, a bicycle—power element 1042, a bicycle—human power element 1044, a bicycle—chain element 1046, a bicycle—pedals element 1048, and a bicycle—handlebars element 1050.

The system 1000 instantiates the electric generator element 1002, the tank element 1014, the outboard engine element 1026, and the bicycle element 1040. The electric generator element 1002 is decomposed based on its relationships to instantiate the electric generator-power element 1004, the electric generator—engine element 1006, the electric generator-dynamo element 1008, the electric generator—generator element 1010, and the electric generator—alternator element 1012. The tank element 1014 is decomposed based on its relationships to instantiate the tank—treads element 1016, the tank—power element 1018, the tank—engine element 1020, the tank—dynamo element 1022, and the tank—generator element 1024. The outboard engine element 1026 is decomposed based on its relationships to instantiate the outboard engine—engine element 1028, the outboard engine—power element 1030, the outboard engine—starter element 1032, the outboard engine—dynamo element 1034, the outboard engine—generator element 1036, and the outboard engine—propeller element 1038.

The bicycle element 1040 is decomposed based on its relationships to instantiate the bicycle element 1040, the bicycle—power element 1042, the bicycle—human power element 1044, the bicycle—chain element 1046, the bicycle—pedals element 1048, and the bicycle—handlebars element 1050.

During the dialectic engine 334 create method, electric generator element 1002 is created, which attempts to bind the electric generator—engine element 1006 and the electric generator—generator element 1010. The electric generator element 1002 navigates (through the Power and Dynamo supertypes) and binds to the outboard engine—engine element 1028 and the outboard engine—generator element 1036 in the outboard engine element 1026 using concrete bindings.

The dialectic engine 334 attempts to create additional instances of electric generator element 1002 until no additional instance of the same type are successfully bound. In system 1000, a total of four pattern instances of electric generator element 1002 are created and bound in the pattern instance graph memory structure 332. The pattern instances with concrete bindings are the electric generator element 1002 created from the outboard engine—engine element 1028 and the outboard engine—generator element 1036, where the completeness value is 1.0; the electric generator element 1002 created from the outboard engine—engine element 1028 and the tank—generator element 1024, where the completeness value is 1.0; the electric generator element 1002 created from the tank—engine element 1020 and the tank—generator element 1024, where the completeness value is 1.0; and the electric generator element 1002 created from the tank—engine element 1020 and the outboard engine—generator element 1036, where the completeness value is 1.0.

The dialectic engine 334 now creates a fifth electric generator element 1002 instance and attempts to bind its pattern elements 320. The electric generator—generator element 1010 is bound concretely as described in the previous step. However, the electric generator—power element 1004 cannot be bound concretely. The electric generator element 1002 attempts to bind the electric generator—power element 1004 using a fuzzy binding. To do so, the electric generator element 1002 examines the predicates attribute within the pattern, which defines a set of relations between pattern elements 320 using first order logic. An element querying component may be utilized. In this embodiment, the predicate for this pattern is ∀ ElectricGenerator, ∃ Power P, ∃ Dynamo D, ∃ Electricity E, Turns(P,D), Produces(D,E), which essentially states that for all electric generator element 1002, there exists Power and a Dynamo, that the Power turns the Dynamo, and that the Dynamo produces Electricity. The dialectic engine 334 utilizes deduction and the logic processor to infer that because the electric generator element 1002 contains Power and Power turns the Dynamo, and that the Dynamo produces Electricity, then in effect, Power produces Electricity.

Using a process of hypothesis generation, which emulates abductive reasoning, the dialectic engine 334 searches the pattern instance graph memory structure 332 for one or more candidate elements. Here, those one or more candidate elements are those pattern elements 320 that could be used to create an electric generator element 1002. The dialectic engine 334 traverses all of the subtypes of Power and traverses up to the pattern elements 320 that contains them. In this case, the tank element 1014 and the outboard engine element 1026 have been resolved through concrete bindings and are ignored.

The dialectic engine 334 then selects the bicycle element 1040 for further consideration. The dialectic engine 334 inspects the predicates contained in the bicycle element 1040. The dialectic engine 334 may utilize an element querying component. In this embodiment, the predicates are ∀ Bicycle, ∃ HumanPower H, ∃ Pedals P, ∃ Chain C, ∃ Wheels W, Turns(H,P), Turns(P,C), Turns(C,W), Produces (W, Motion). The dialectic engine 334 now finds a match with the Turns predicate as well as the bicycle—power element 1042 previously found and creates a hypothesis that a bicycle element 1040 could be used as an electric generator element 1002.

To test that hypothesis, the dialectic engine 334 next employs inductive reasoning utilizing an internet search engine, a lexical control memory structure 310 (such as WordNet), a thesaurus, Bayesian inference, and a natural language processing engine 328. The dialectic engine 334 attempts to determine the probability that humans have recorded evidence of using a bicycle to produce electricity.

A search querying component searches the lexical control memory structure 310 to find the synonym ring, or synset for the terms bicycle, generator, electricity, and the verb produces. This synset contains words that are considered to be semantically equivalent for the purposes of information retrieval. If sufficient matches are not found in the lexical control memory structure 310, a thesaurus is searched for synonyms and these are cross-referenced in the lexical control memory structure 310 to match on concept category. If terms match the concept category, they are added to the synset related to that specific concept. An internet search engine (e.g., Google) is searched for the terms "Bicycle", "Produces", "Electricity". The resulting html is captured as a search resultset.

A natural language processing engine 328 using a component such as a probabilistic context-free grammar parsers processes each page and looks for a one or more matching combinations utilizing a "Noun-Verb-Noun" parse tree (or similar combinations using Nbar, Noun Phrases, Transitive verb form, etc.) that corresponds to combinations of this grammar with the synonyms for "Bicycle-Produces-Electricity". Each time one or more matching combinations is matched, a counter may be incremented.

Using Bayesian inference, via a probability analyzer, the posterior probability of a human recording a bicycle producing electricity given humans recording bicycles and electricity is calculated. For this example, the probability is 62%. This value is now captured as the completeness value of the electric generator—power element 1004 contained in the pattern instance graph memory structure 332.

To calculate the overall fuzzy value of this instance of the electric generator element 1002, the completeness value of the electric generator—generator element 1010 (1.0 as it is a concrete binding) is multiplied by the completeness value of the electric generator—power element 1004 binding (the fuzzy binding calculated previously, for example, a 62% probability). This results in a 1*0.62=0.62 value for the completeness value of this new electric generator element 1002.

There are now five instances of the electric generator element 1002 in the pattern instance graph memory structure 332. Four of these were created with concrete bindings and have a completeness value of 1.0, and the fifth instance was created using a fuzzy binding and has a completeness value of 0.62.

Figure 11:
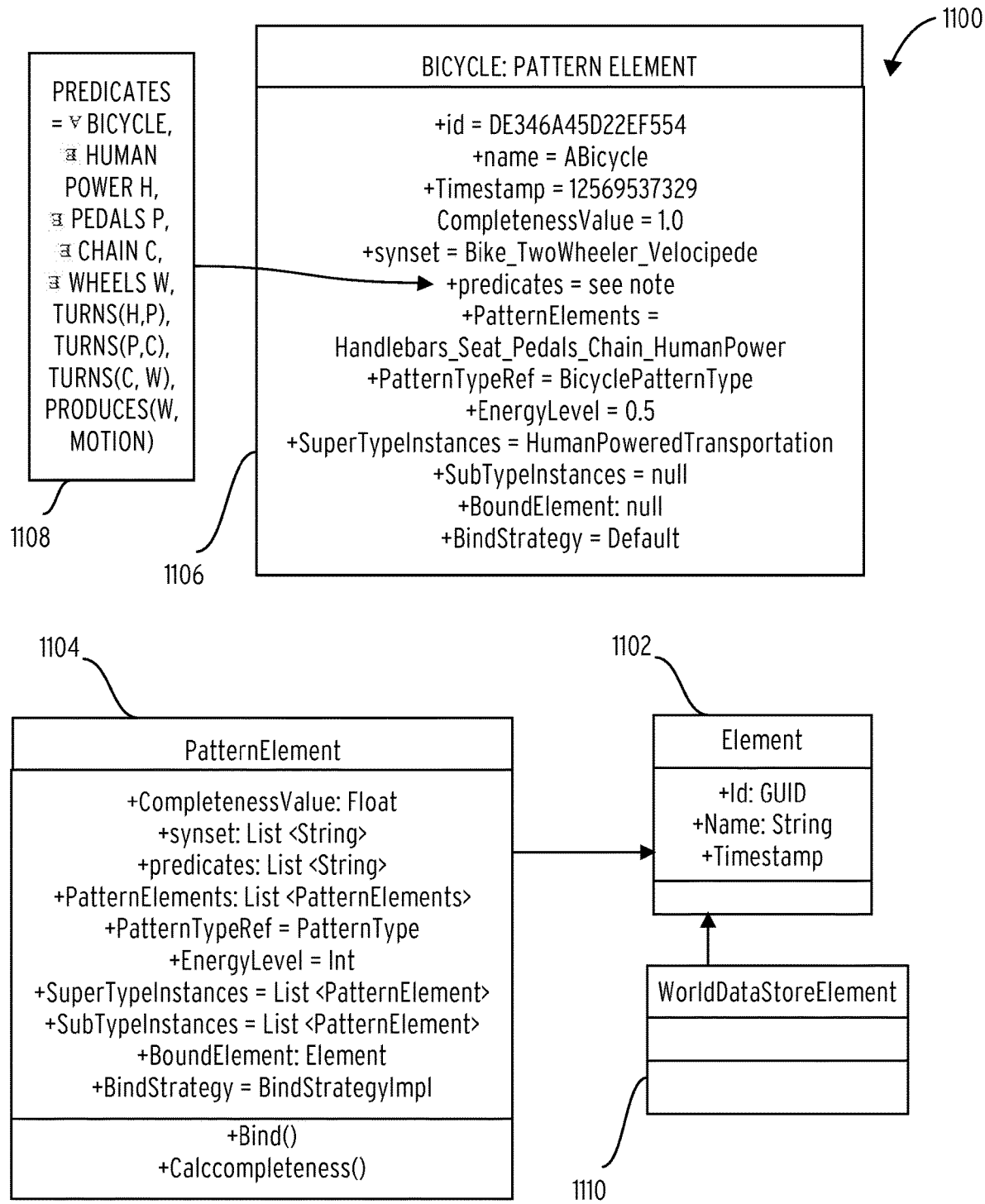
FIG. 11 illustrates an embodiment of a pattern element 1100.

Referring to FIG. 11, a pattern element 1100 comprises an element class 1102, a pattern element class 1104, a bicycle pattern element 1106, a bicycle predicates 1108, and a world data store element 1110.

The pattern bicycle pattern element 1106 inherits from the element class 1102, which provides basic identification and timestamp attributes. The pattern element class 1104 then adds a completeness value, a synset, predicates, pattern elements, an energy level, a supertype instances, a subtype instances, a bound element, and a bind strategy. The bicycle pattern element 1106 may comprise additional attributes. The world data store element 1110 inherits from the element class 1102, which provides basic identification and timestamp attributes.

The completeness value describes the binding of the pattern elements 320 and ranges from 0 to 1. Values in between 0 and 1 are fuzzy values and may be inferred from probabilities.

In some embodiments, the pattern elements 320 comprise subordinate pattern elements 320. In such an embodiment, the overall binding of the pattern instance is calculated by fuzzy logic algebra.

The synset comprises a list of synonyms that are semantically equivalent for information retrieval purposes. In some embodiments, the synset is obtained from a lexical control memory structure 310.

The predicates comprise relationships between the pattern elements 320 and other pattern elements 320 described in first order logic. The bicycle predicates 1108 may represent the predicates for the bicycle pattern element 1106.

The pattern elements 320 comprise other subordinate pattern elements 320. Compositional-type pattern type elements 318, such as the bicycle, tank, or outboard motor may have related pattern elements 320. The bicycle pattern element 1106 comprises subordinate pattern elements 320 handlebars, seat, pedals, chain, and human power.

The energy level allocates a CPU processing budget when creating new pattern instances and binding to possible controllers. This serves as a governor to bound the system.

The supertype instances is a list of the pattern elements instantiated in a pattern instance graph memory structure that have a supertype relationship to the selected pattern element.

The subtype instances is a list of the pattern elements instantiated in the pattern instance graph memory structure that have a subtype relationship to the selected pattern element.

The bound element is a link from the pattern element to either another pattern element or an element in a world data store. The binding can be either concrete or fuzzy and is quantified with an incompleteness value.

The bind strategy is the name of the implementation class that encapsulates the strategy used to bind pattern elements to other pattern element or elements in the world data store.

The world data store element 1110 inherits from the element class 1102, which provides basic identification and timestamp attributes.

Figure 12:
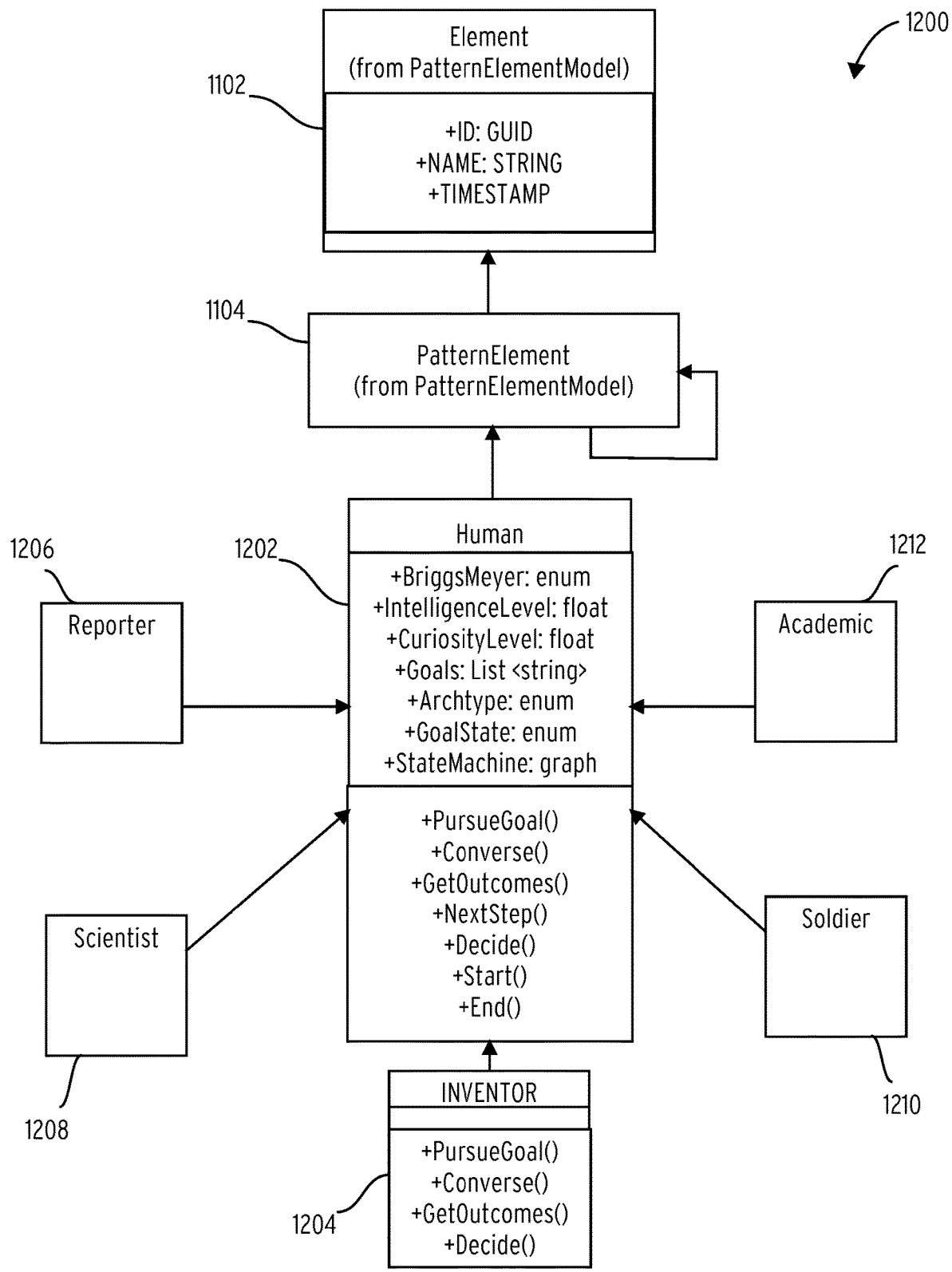
FIG. 12 illustrates an embodiment of a pattern element 1200.

Referring to FIG. 12, a pattern element 1200 comprises an element class 1102, and pattern element class 1104, a human class 1202, an inventor subtype 1204, a reporter subtype 1206, a scientist subtype 1208, a soldier subtype 1210, and an academic subtype 1212.

The human class 1202 inherits from the element class 1102 and the pattern element class 1104 and, therefore, comprises the attributes described in FIG. 11. The human class 1202 then adds the additional attributes and operations. The BriggsMeyer attribute comprises an enumerated constant associated with sixteen different personality types to describe personality preferences. Changing this value changes the behavior of the system. The IntelligenceLevel attribute comprises a float ranging from 0.0 to 1.0 and controls the depth of processing power pattern elements and the dialectic engine 334 will expend during a Create/Destroy process and fuzzy binding. The CuriosityLevel attribute comprises a float ranging from 0.0 to 1.0 and controls the width of searches in the pattern type store control memory structure 324 during the Create/Destroy process. The Goals attribute comprises a list of strings which describe the end goals for this human class 1202 and is used for display, troubleshooting and code understanding. The Archetype attribute comprises an enumerated constant containing the twelve archetypes based on Jung's theory of the human psyche. Changing this value changes the behavior of the system. The Goal State attribute comprises an enumerated constant which contains the state of the human with respect to pursuing and achieving their goal (e.g. started, in progress, at step number, ended). The State Machine attribute comprises a directed acyclic graph describing the process and probabilities of each step towards reaching an optimal goal.

The Pursue Goal attribute is abstract in the base and implemented differently in each subtype of human according to the specific goals of that type of human. The Converse attribute utilizes the natural language processing engine 328 to interact with text messages via natural language. The Get Outcomes attribute returns the outcomes achieved at any point during the human object's lifetime. The Next Step attribute advances the steps in the process described by the State Machine. The Decide attribute is provided several alternatives and based on the settings above and through interacting with other patterns selects an optimal choice from the list of alternatives. The Start attribute starts the state machine process and moves to the first step. The End attribute stops the state machine process and moves to the final step.

Other classes may be used to represent other known beings, including but not limited to other apes, birds, etc. Postulated beings may also be represented by a class. Additionally, the human class 1202 may represent intelligent hominids other than that of the species *Homo sapiens*. Each of these classes may have associated subclasses. Additionally, other known beings may be represented as a subclass of human.

The inventor subtype 1204, the reporter subtype 1206, the scientist subtype 1208, the soldier subtype 1210, and the academic subtype 1212 each inherits from the human class 1202 and overrides the methods shown in the diagram to provide behavior specific to the inventor subtype 1204, the reporter subtype 1206, the scientist subtype 1208, the soldier subtype 1210, and the academic subtype 1212, respectively (e.g., find possible parts, examine the relationship between the parts, search for additional candidate relationships and parts, generate hypotheses regarding possible new inventions, test the hypothesis by searching for evidence, discard hypotheses without evidence, rank the resulting hypotheses and select an optimal new invention). The process is executed according to the personality types, curiosity, and intelligence level of the human class 1202. Other subtypes may affect the human class 1202, including but not limited to child, doctor, assembly line worker, etc. Each subclass may affect different attributes. In one embodiment, the human class 1202 is affected by the inventor subtype 1204, the PursueGoal attribute, the Converse attribute the GetOutcomes attribute, and the Decide attribute of the human class 1202 are overridden by those attributes from the inventor subtype 1204.

Figure 13:
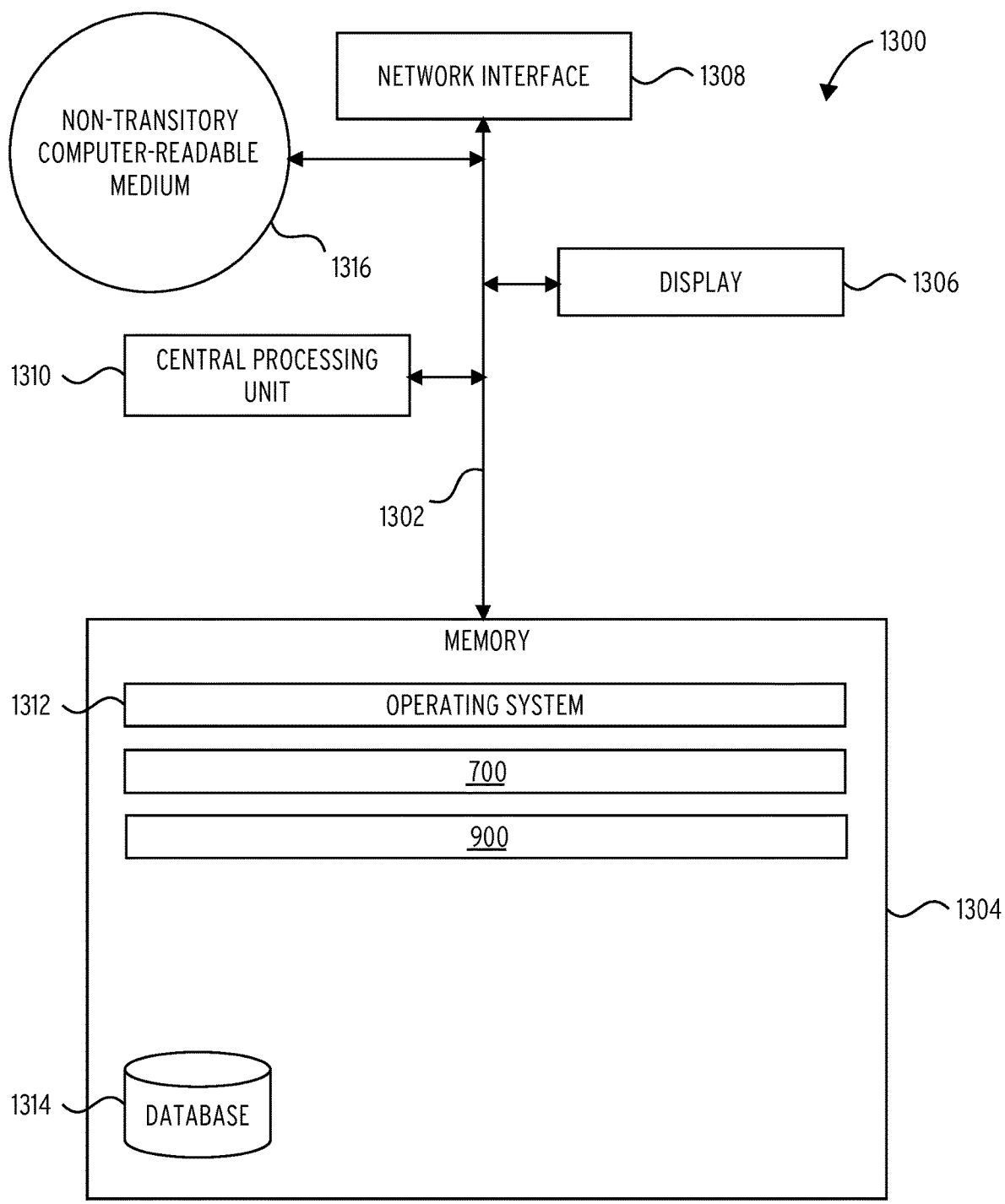
FIG. 13 illustrates an embodiment of a system 1300.

FIG. 13 illustrates several components of an exemplary system 1300 to implement an AI machine and process in accordance with one embodiment. In various embodiments, system 1300 may include a desktop PC, server, workstation, mobile phone, laptop, tablet, set-top box, appliance, or other computing device that is capable of performing operations such as those described herein. In some embodiments, system 1300 may include many more components than those shown in FIG. 13. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1300 may comprise one or more physical and/or logical devices that collectively provide the functionalities described herein. In some embodiments, system 1300 may comprise one or more replicated and/or distributed physical or logical devices.

In some embodiments, system 1300 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1300 includes a bus 1302 interconnecting several components including a network interface 1308, a display 1306, a central processing unit 1310, and a memory 1304.

Memory 1304 generally comprises a random access memory ("RAM") and permanent non-transitory mass storage device, such as a hard disk drive or solid-state drive. Memory 1304 stores an operating system 1312.

These and other software components may be loaded into memory 1304 of system 1300 using a drive mechanism (not shown) associated with a non-transitory computer-readable medium 1316, such as a floppy disc, tape, DVD/CD-ROM drive, memory card, or the like.

Memory 1304 also includes database 1314. In some embodiments, system 1300 may communicate with database 1314 via network interface 1308, a storage area network ("SAN"), a high-speed serial bus, and/or via the other suitable communication technology.

In some embodiments, database 1314 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media).

"Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

[3] Boyd, J. R. Destruction and Creation. Goal Systems International [online], 3 Sep. 1976 [retrieved on 2017-01-31]. Retrieved from the Internet: <http://www.goalsys.com/books/documents/DESTRUCTION_AND_CREATION.pdf>.

What is claimed is:

1. A method of orienting a human behavioral model to a problem context in an artificial intelligence algorithm, the method comprising:

extracting entities from an input signal;
 relating the entities to values in a data store;
 instantiating pattern instances from a plurality of different stored pattern types to generate executable objects each comprising logic to operate as an autonomous agent to perform a binding with the values in the data store and execute a completeness function for the binding;
 wherein the pattern types comprise a hierarchy of class types and subtypes for the entities;
 wherein the completeness function comprises logic to generate a metric of an extent of binding between attributes of the entities and attributes of pattern types;
 joining the executable objects into a pattern instance graph;

the executable objects autonomously operating as a deduction processor to selectively bind the executable objects in the pattern instance graph to the values in the data store to form bound pattern instance graphs;

orienting the human behavioral model to the problem context by repeatedly evaluating a fit between the bound pattern instance graphs and the human behavioral model instantiated as additional pattern instances, by:
operating an abduction processor to competitively execute the additional pattern instances as a plurality of controller elements with the bound pattern instances to compute levels of fitness for the controller elements;
assigning one of the controller elements based on the level of fitness as a current controller element; and
operating an induction processor by executing the current controller element as an autonomous agent.

2. The method of claim 1, wherein repeatedly evaluating a fit between the bound pattern instance graphs and a stored human behavioral model further comprises:
assigning one of the controller elements having a highest level of fitness as a current controller element.

3. The method of claim 1, wherein repeatedly evaluating a fit between the bound pattern instance graphs and a stored human behavioral model further comprises:
assigning one of the controller elements having a lowest level of fitness as a current controller element.

4. The method of claim 1, further comprising:
organizing the controller elements into a hierarchy; and
modeling a different composite system with each root controller element of the hierarchy.

5. The method of claim 4, wherein children of each root controller element model components of the different composite systems.

6. The method of claim 1, wherein the autonomous agent utilizes Bayesian inference.

7. The method of claim 1, wherein the stored pattern types comprise a pattern type attribute, a list for a plurality of super types, and a list for a plurality of sub types.

8. The method of claim 7, wherein the stored pattern types further comprise a completeness value, a list for a plurality of predicates, a list for a plurality of pattern elements, and a binding strategy attribute.

9. The method of claim 1, wherein the additional pattern instances are instantiated from pattern types comprising a human role attribute.

10. The method of claim 9, wherein the additional pattern instances are instantiated from pattern types further comprising a Briggs-Meyer attribute, an intelligence level attribute, and a curiosity level attribute.

11. A system comprising:
a deduction processor;
an induction processor;
an abduction processor;
a fact processor configured to extract entities from an input signal and to relate the entities to values in a data store;
a plurality of stored entity pattern types; and
a controller comprising a plurality of controller elements, the controller configured to orient a human behavioral model to a problem context in an artificial intelligence algorithm by:
instantiating pattern instances from the entity pattern types to generate executable objects for the controller elements, each comprising logic to operate as an autonomous agent to perform a binding with the values in the data store and execute a completeness function for the binding, wherein the pattern types comprise a hierarchy of class types and subtypes for the entities, and wherein the completeness function comprises logic to generate a metric of an extent of binding between attributes of the entities and attributes of pattern types;
joining the executable objects into a pattern instance graph in accordance with the hierarchy of class types and subtypes;
executing the instantiated pattern instances as the deduction processor to selectively bind the executable objects in the pattern instance graph to the values in the data store to form bound pattern instance graphs;
repeatedly evaluating a fit between the bound pattern instance graphs and a stored human behavioral model instantiated as additional pattern instances, by:
operating the abduction processor to competitively execute each of the controller elements to evaluate a level of fitness of the additional pattern instances with the bound pattern instances in the bound patterns instance graphs;
assigning one of the controller elements based on the level of fitness as a current controller element; and
operating the induction processor by executing the current controller element as an autonomous agent.

12. The system of claim 11, wherein orienting the human behavioral model to the problem context further comprises:
assigning one of the controller elements having a highest level of fitness as a current controller element.

13. The system of claim 11, wherein orienting the human behavioral model to the problem context further comprises:
assigning one of the controller elements having a lowest level of fitness as a current controller element.

14. The system of claim 11, wherein:
the controller elements are organized into a hierarchy; and
each root controller element of the hierarchy models a different composite system.

15. The system of claim 14, wherein children of each root controller element model components of the different composite systems.

16. The system of claim 11, wherein the autonomous agent utilizes Bayesian inference.

17. The system of claim 11, wherein each pattern instance comprising an executable model and logic to search for and bind to attributes of the human behavioral model and to evaluate and store a level of completeness of the bind.

18. The system of claim 11, wherein the controller is configured to selectively bind the executable objects in the pattern instance graph to the values in the data store to form bound pattern instance graphs utilizing a supertype and subtype traversal of the pattern types in the pattern instance graph.

* * * * *